(12) United States Patent
Park

(10) Patent No.: US 12,470,047 B2
(45) Date of Patent: Nov. 11, 2025

(54) SHUTTER ASSEMBLY AND SWITCHBOARD COMPRISING SAME

(71) Applicant: LS ELECTRIC CO., LTD., Anyang-si (KR)

(72) Inventor: Yong Ik Park, Anyang-si (KR)

(73) Assignee: LS ELECTRIC CO., LTD., Anyang-si (KR)

( * ) Notice: Subject to any disclaimer, the term of this patent is extended or adjusted under 35 U.S.C. 154(b) by 180 days.

(21) Appl. No.: 18/574,834

(22) PCT Filed: Dec. 13, 2021

(86) PCT No.: PCT/KR2021/018835
§ 371 (c)(1),
(2) Date: Dec. 28, 2023

(87) PCT Pub. No.: WO2023/013828
PCT Pub. Date: Feb. 9, 2023

(65) Prior Publication Data
US 2025/0141193 A1 May 1, 2025

(30) Foreign Application Priority Data
Aug. 3, 2021 (KR) .................. 10-2021-0102085

(51) Int. Cl.
*H02B 1/14* (2006.01)
(52) U.S. Cl.
CPC ..................................... *H02B 1/14* (2013.01)
(58) Field of Classification Search
CPC ........ H02B 11/24; H02B 1/14; H02B 11/127; H02B 11/173; H02B 11/167; H01R 13/447; H01R 13/453; H01R 13/4534; H01H 9/22
See application file for complete search history.

(56) References Cited

U.S. PATENT DOCUMENTS

| 4,773,870 A | * | 9/1988 | Sinnig | ................... | H02B 11/24 439/136 |
| 5,486,978 A | * | 1/1996 | Fishovitz | ............... | H02B 11/24 200/50.21 |

(Continued)

FOREIGN PATENT DOCUMENTS

| KR | 1019970002005 B1 | 2/1997 |
| KR | 101106854 B1 | 1/2012 |

(Continued)

OTHER PUBLICATIONS

International Search Report for related International Application No. PCT/KR2021/018835; action dated Feb. 9, 2023; (2 pages).

(Continued)

*Primary Examiner* — Michael A Matey
(74) *Attorney, Agent, or Firm* — K&L Gates LLP

(57) ABSTRACT

The present disclosure relates to a shutter assembly and a switchboard comprising same, and provides a shutter assembly comprising: a shutter plate arranged to cover an outer terminal arranged on the rear surface of a switchboard case; and a shutter driving unit which is connected to one side of the shutter plate and which moves the shutter plate in the left and right directions, wherein the shutter driving unit has at least a portion pressed and rotated by means of a circuit breaker according to the entry of the circuit breaker into the switchboard case, so that the outer terminal covered by the shutter plate is exposed toward the inside of the switchboard, and thus the shutter plate is moved.

18 Claims, 13 Drawing Sheets

(56) References Cited

U.S. PATENT DOCUMENTS

| | | | |
|---|---|---|---|
| 7,821,775 B2 * | 10/2010 | Narayanasamy | H02B 11/127 200/50.25 |
| 2014/0090963 A1 * | 4/2014 | Sudhakar | H02B 11/127 200/50.22 |
| 2014/0098469 A1 * | 4/2014 | Parkerson | H02B 11/24 361/617 |
| 2014/0190801 A1 * | 7/2014 | Robarge | H02B 11/24 200/50.22 |
| 2016/0248231 A1 * | 8/2016 | Pope | H02B 11/24 |
| 2022/0102085 A1 * | 3/2022 | Kim | H02B 11/24 |

FOREIGN PATENT DOCUMENTS

| | | |
|---|---|---|
| KR | 20150096878 A | 8/2015 |
| KR | 2020170003126 U | 9/2017 |

OTHER PUBLICATIONS

Written Opinion for related International Application No. PCT/KR2021/018835; action dated Feb. 9, 2023; (5 pages).

\* cited by examiner

SHUTTER ASSEMBLY AND SWITCHBOARD COMPRISING SAME

CROSS-REFERENCE TO RELATED APPLICATION

This application is a National Stage of International Application No. PCT/KR2021/018835, filed on Dec. 13, 2021, which claims priority to and the benefit of Korean Patent Application No. 10-2021-0102085, filed on Aug. 3, 2021, the disclosures of which is incorporated herein by reference in its entirety.

FIELD

The present disclosure relates to a shutter assembly and a switchboard including the same, and more specifically, to a shutter assembly capable of easily opening and closing a shutter plate, and a switchboard including the same.

BACKGROUND

In general, a switchboard is a device installed in a power plant, substation, or electrical facility to monitor, control, and protect electrical systems.

For the operation and control of power plants and substations, operation of electric motors, and various electrical devices such as circuit breakers, safety devices, instruments, indicator lights, and relays may be disposed in the switchboard to facilitate the opening and closing of electric circuits or control of devices.

A circuit breaker may be used by being stored inside a circuit breaker room of the switchboard and used by being divided into two positions, that is, a RUN position and a TEST position.

When the circuit breaker is moved to a rear RUN position inside the switchboard, a terminal provided behind the circuit breaker may be connected to the terminal provided on a rear surface of the switchboard to supply a current to a load side through a main circuit unit of the circuit breaker.

When the circuit breaker is moved to a front TEST position inside the switchboard, the terminal provided behind the circuit breaker is separated from the terminal provided on the rear surface of the switchboard to test only the operation of the circuit breaker and not to supply a current to the main circuit unit of the circuit breaker.

Therefore, when the circuit breaker is positioned at the TEST position, even when the user opens a door of the circuit breaker room, no current flows in the circuit breaker, and thus there is no concern of exposure to risks such as electric shock.

However, if a user arbitrarily opens the door of the circuit breaker when the circuit breaker is positioned at the RUN position, the user may be exposed to a high voltage current of the circuit breaker that causes electric shock or the like when a high voltage is applied to the main circuit unit of the circuit breaker.

In order to solve these problems, the present applicant has used a shutter assembly in which a main circuit unit is blocked by a shutter plate when the circuit breaker is positioned at the TEST position, and the shutter plate is moved when the circuit breaker is inserted.

However, since the conventional shutter assembly has a diverse and complex configuration, it is expensive to manufacture, and it takes much time and money to install the shutter assembly in the switchboard. In addition, there were problems such that the shutter assembly failed in a process of using the corresponding shutter assembly.

SUMMARY

Therefore, the present disclosure has been made in efforts to solve these problems and is directed to providing a shutter assembly capable of performing an opening and closing operation of a shutter plate using a shutter assembly with a simple structure as a circuit breaker enters a switchboard case, and a switchboard including the same.

According to one aspect of the present disclosure, there is provided a shutter assembly including a shutter plate disposed to cover an external terminal disposed on a rear surface of a switchboard case, and a shutter driving unit connected to one side of the shutter plate and configured to move the shutter plate in a left-right direction, wherein the shutter driving unit is configured so that the shutter plate is moved by at least a portion that is rotated by being pressed by a circuit breaker as the circuit breaker enters the switchboard case so that the external terminal covered by the shutter plate is exposed toward an inside of a switchboard.

The shutter driving unit may include a bracket mounted on a side plate of the switchboard case, and a slider connected to the bracket to be moved relative to the bracket, and the slider may be moved toward the rear surface and a front surface of the switchboard case by the circuit breaker and may move at least a portion of the shutter plate.

The bracket may include a bracket body mounted on a side surface of the switchboard case, and the bracket body may include an elastic member hook protrusion protruding from one end thereof and configured to fix one end of an elastic member, and a coupling protrusion protruding from the other end thereof and protruding in a direction opposite to a protruding direction of the elastic member hook protrusion.

The bracket body may be formed with a fixing groove through which a fixing unit configured to fix the bracket body to the side plate of the switchboard case passes.

The bracket body may include a main body disposed close to the front surface of the switchboard case, and a first split body and a second split body vertically separated and extending from the main body toward the rear surface of the switchboard case, a coupling protrusion coupled to the side plate of the switchboard case may be disposed on the first split body, and the fixing groove may be formed in the second split body.

The slider may include a slider body mounted on the bracket to be moved back and forth, and a shutter lever unit coupled to the slider body and rotated according to a degree of movement of the circuit breaker to move the shutter plate.

The slider body may include an elastic member fixing protrusion configured to support the other end of the elastic member.

The slider body may include a grip hook configured to surround at least a portion of the shutter plate and disposed so that a distance between the shutter plate and the slider is small.

The grip hook may be disposed to protrude toward a rear surface of the slider in a longitudinal direction and fixed to be rotated relative to the slider body.

The grip hook may include an inclined portion formed to be inclined so that a thickness thereof becomes smaller toward an end portion thereof, and a protruding portion protruding downward from an inside of the inclined portion.

A guide groove through which a bolt passing through a fixing groove of a bracket body passes and which is formed in a rectangular shape may be formed in the slider body.

The guide groove formed in the slider body may include a first guide groove formed in a section corresponding to a main body, and a second guide groove formed in a section corresponding to a second split body.

The shutter lever unit may include a shutter lever having one side formed to be rotated by being pressed by the circuit breaker and the other side formed to be fitted into the shutter plate, a through pin passing through at least a portion of the shutter lever unit, and a restoration member fitted into the through pin and providing a restoring force to the shutter lever.

The shutter lever may include a first portion disposed to protrude toward an inner central portion of the switchboard case and rotated by being pressed as the circuit breaker is inserted, a second portion extending adjacent to the first portion and formed with a through hole into which the through pin is inserted, and a third portion inserted into the shutter plate and moved while being rotated to move the shutter plate.

The third portion may further include a support protrusion protruding from a rear surface of the second portion so that one end of the restoration member is fixed.

The shutter plate may include a first shutter plate formed to cover a cross section of the switchboard case and formed with a first opening corresponding to the external terminal, and a second shutter plate disposed on a rear surface of the first shutter plate and formed with a second opening corresponding to the first opening.

The first shutter plate and the second shutter plate may be disposed so that the first opening and the second opening are misaligned, and the second shutter plate may be configured to move as the shutter driving unit is rotated so that the second opening corresponds to the first opening.

A first through portion through which a shutter lever unit passes may be formed in the first shutter plate, a second through portion through which the shutter lever unit passing through the first through portion passes may be formed in the second shutter plate, and the first through portion may be formed to be wider than the second through portion.

According to another aspect of the present disclosure, there is provided a switchboard including a switchboard case having a space in which a circuit breaker is accommodated and having a front surface formed with an opening and a rear surface on which an external terminal is disposed, a circuit breaker connected to the external terminal and inserted into and withdrawn from the switchboard case, and a shutter assembly disposed inside the switchboard case and configured to open and close the external terminal as the circuit breaker is inserted and withdrawn, wherein the shutter assembly includes a shutter plate disposed to cover the external terminal, and a shutter driving unit connected to one side of the shutter plate and configured to move the shutter plate in a left-right direction, and the shutter driving unit is configured so that the shutter plate is moved by at least a portion that is rotated by being pressed by the circuit breaker as the circuit breaker enters the switchboard case so that the external terminal covered by the shutter plate is exposed toward an inside of a switchboard.

The shutter plate may be disposed on a front surface of the external terminal in a closed state and configured to expose the external terminal when moved as the circuit breaker is inserted and changed to an open state, the shutter driving unit may include a bracket disposed at at least one side of the shutter plate and mounted on a side plate of the switchboard case, and a slider connected to the bracket to be moved relative to the bracket, and the slider may be configured to move the shutter plate in a front-rear direction, and at the same time, move at least a portion of the shutter plate in a left-right direction.

As described above, according to one embodiment of the present disclosure, a shutter assembly can close or open an external terminal by moving a shutter plate through a simple structure of a bracket and a slider. Therefore, it is possible to increase the ease of the manufacture of a switchboard and reduce manufacturing costs.

In addition, according to one embodiment of the present disclosure, the shutter assembly can have a plurality of fixing grooves in a bracket body to firmly couple a bracket body to a switchboard case side plate.

In addition, according to one embodiment of the present disclosure, since the shutter assembly can include a first split body and a second split body separated vertically from a main body to a rear surface of a switchboard case, and a fixing groove can be formed in a main body and the second split body, and a fixing protrusion can be formed on the first split body, a slider can effectively support the switchboard side plate with respect to a rotational moment that can be generated in a process in which the slider moves. Therefore, even when the rotational moment is generated in the bracket body, the bracket body can be firmly coupled to the switchboard case by the above-described structure.

In addition, according to one embodiment of the present disclosure, the shutter assembly includes a first guide groove and a second guide groove formed in a vertical direction and formed to be separated in a horizontal direction and absorbed by a bolt head caught on the first guide groove or a bolt head caught on the second guide groove by the rotational moment that can be generated when a slider body moves. Therefore, the slider body is not rotated and can be moved straight by the rotational movement generated when moving in a front-rear direction.

In addition, according to one embodiment of the present disclosure, since the shutter plate is gripped adjacent to the slider body by a grip hook, the slider body and the shutter plate can be moved in the front-rear direction without being separated from each other when the slider body moves. Therefore, a pressing force transmitted to the slider can be easily transmitted to the shutter plate.

In addition, according to one embodiment of the present disclosure, a plurality of guide grooves of a second shutter plate can be formed to reduce a rotational moment that can be generated when moving so that the second shutter plate can be moved.

BRIEF DESCRIPTION OF THE DRAWINGS

FIG. 3 illustrates a closed state of the shutter plate, and FIG. 4 illustrates an open state of the shutter plate.

FIG. 10 illustrates a closed state of the shutter plate, and FIG. 11 illustrates an open state of the shutter plate.

DETAILED DESCRIPTION

Hereinafter, embodiments of the present disclosure will be described in detail with reference to the accompanying drawings so that those skilled in the art to which the present disclosure pertains may easily carry out the present disclosure.

In the following description, in order to clarify the characteristics of the present disclosure, descriptions of some components may be omitted.

The term "electrical connection" used in the following description means that an electric current or electrical signal is transmitted between one or more members.

The term "switchboard" used in the following description refers to a device for regularly inserting and managing switches, instruments, relays (relays), and the like. On a front surface of the switchboard, an operating lever for opening and closing a circuit breaker of a high voltage main circuit, an air switch (air circuit breaker) of a low voltage main circuit, a voltmeter, an ammeter, a wattmeter, an integrated power meter, an eddy current relay, and the like may be disposed.

The term "circuit breaker" used in the following description refers to a circuit breaker configured to extinguish an arc using air or compressed air. The components to be described below are assumed to be applied to the air circuit breaker.

However, the components to be described below may be applied to air circuit breakers, compressed air circuit breakers, gas circuit breakers, oil circuit breakers, and vacuum circuit breakers.

Figure 1:
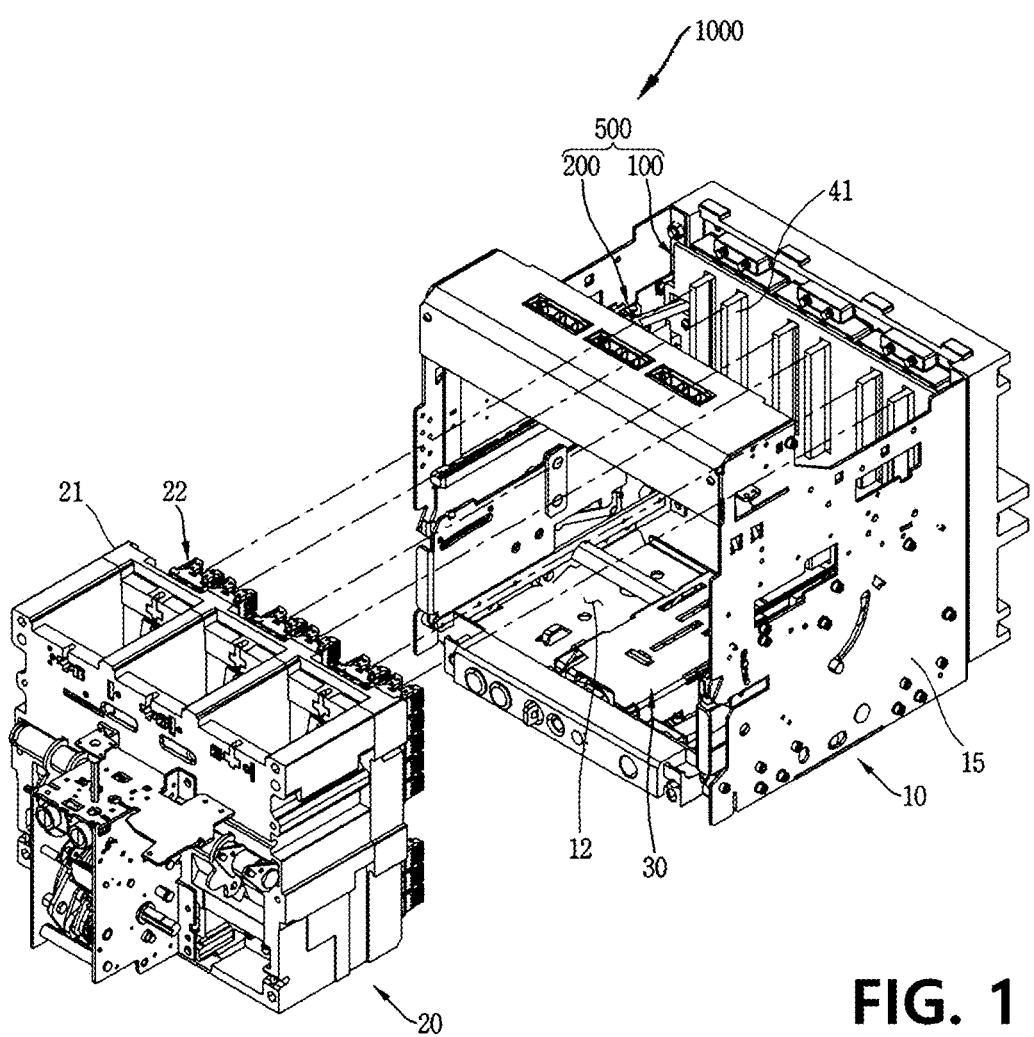
FIGS. 1 and 2 are perspective views illustrating a state in which a circuit breaker is inserted into a switchboard according to one embodiment of the present disclosure from different directions.
Figure 2:
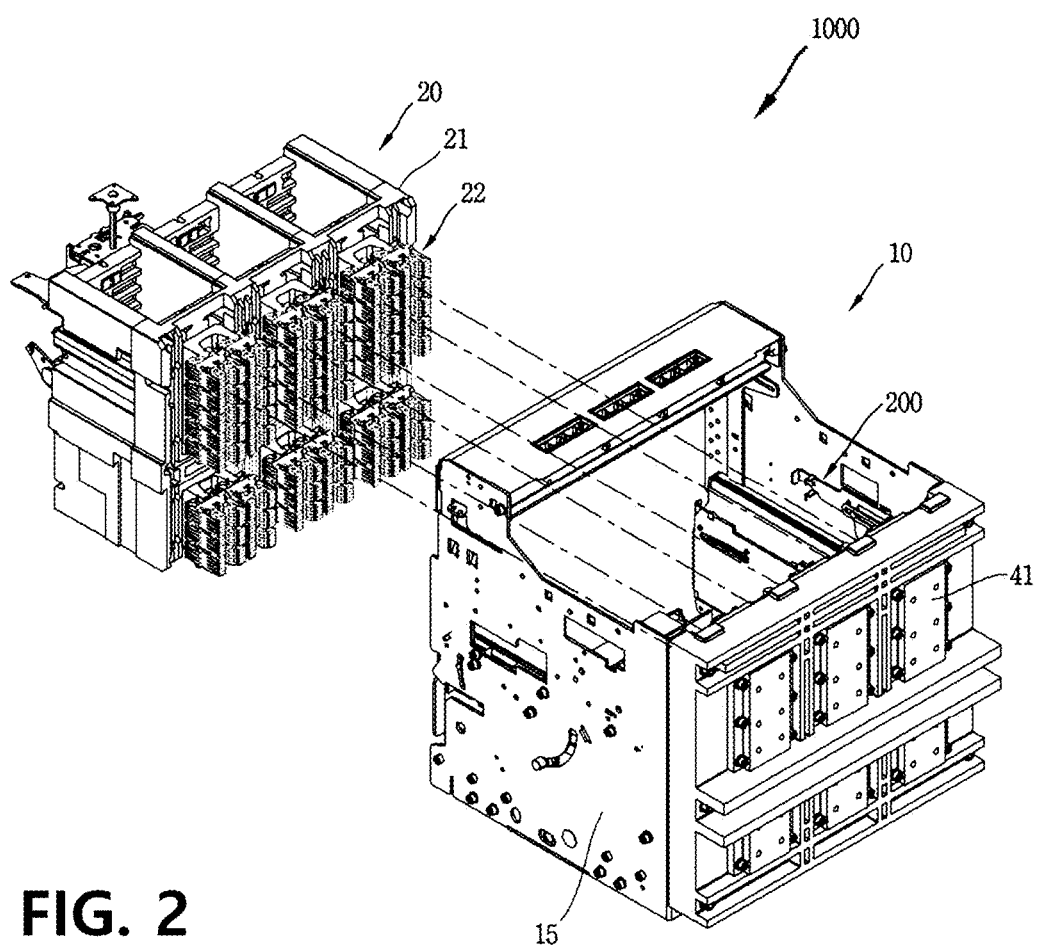
Figure 3:
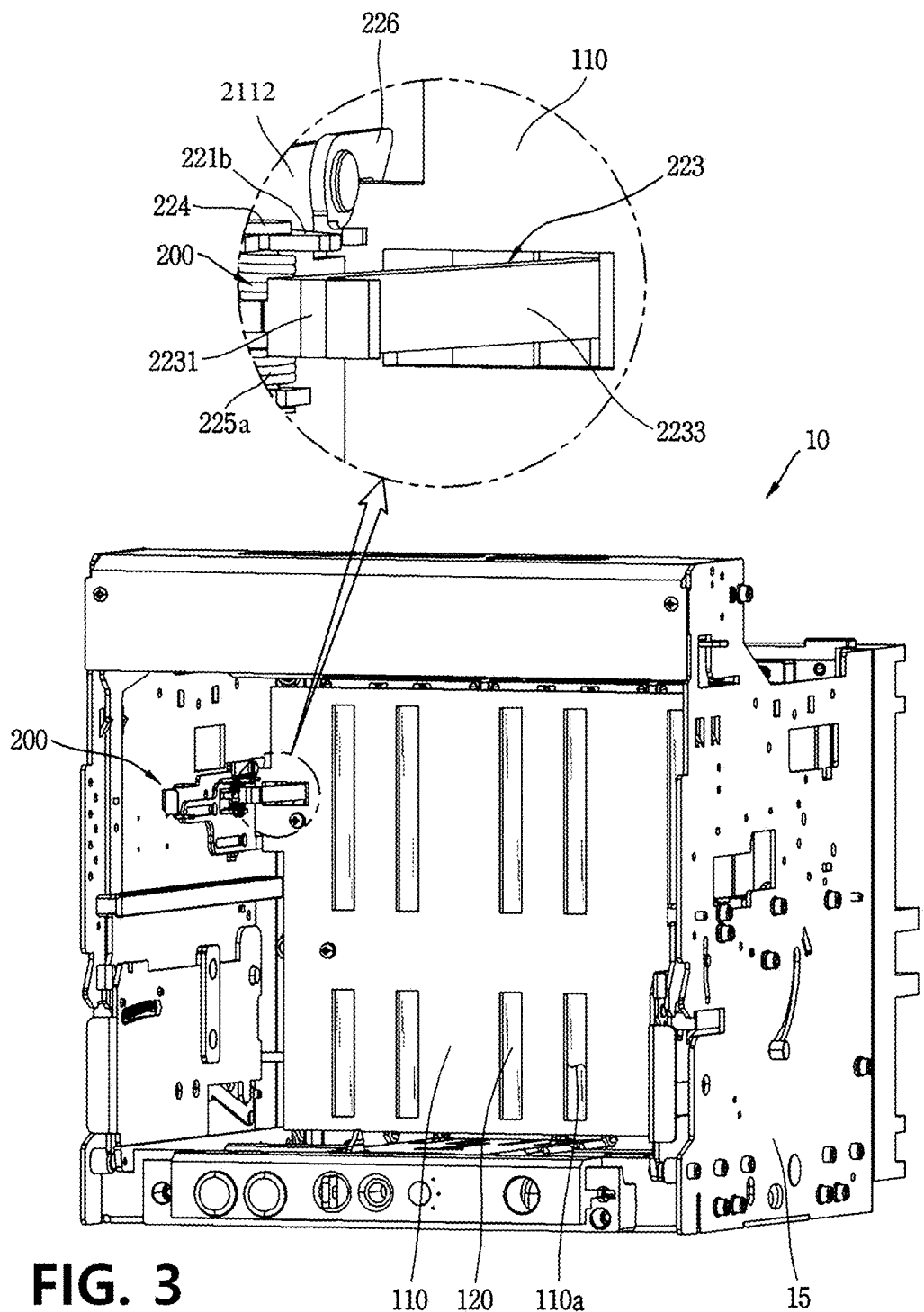
FIGS. 3 and 4 are perspective views for describing a shutter plate and a shutter driving unit inside the switchboard according to one embodiment of the present disclosure. In this case.
Figure 4:
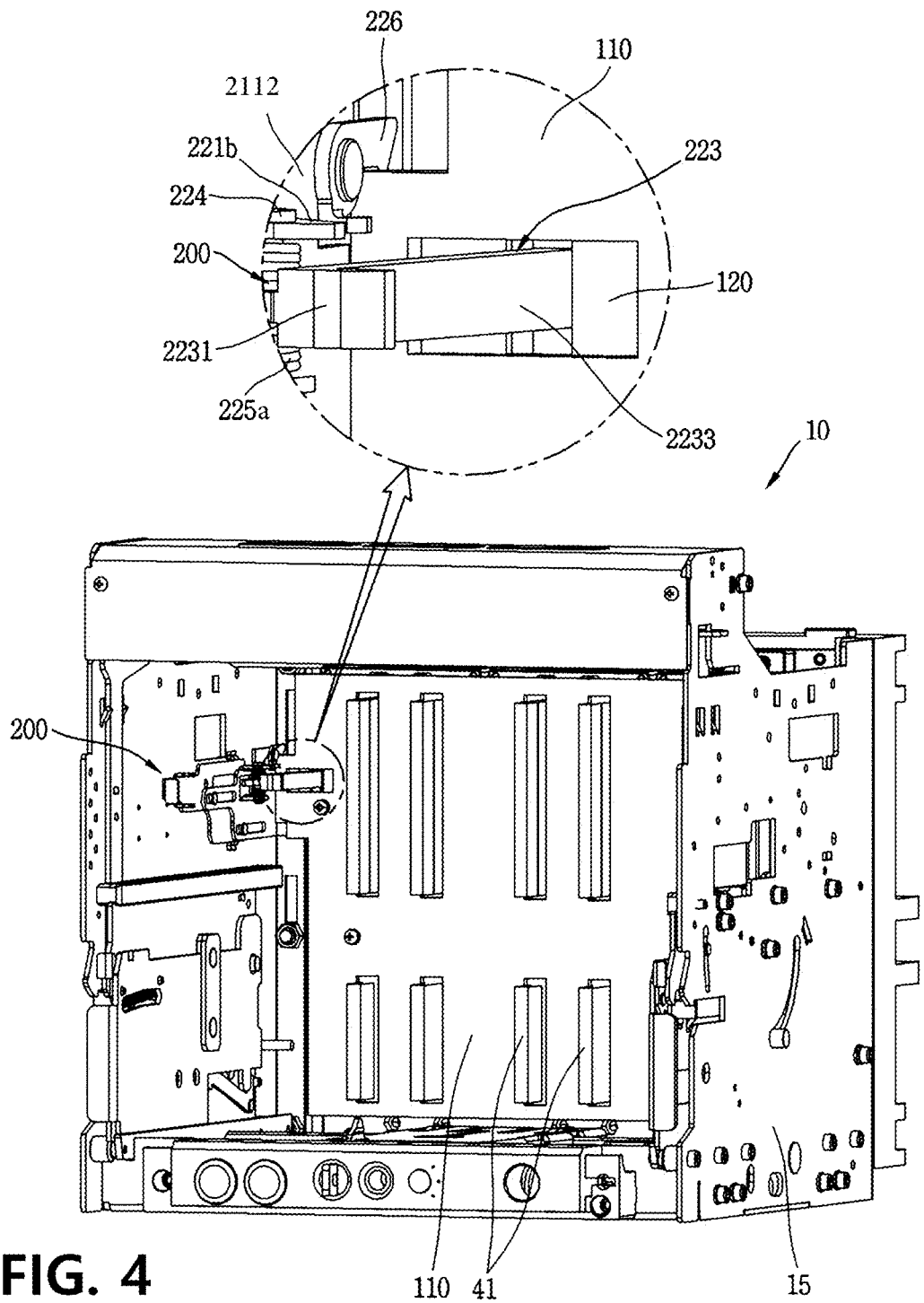
Figure 5:
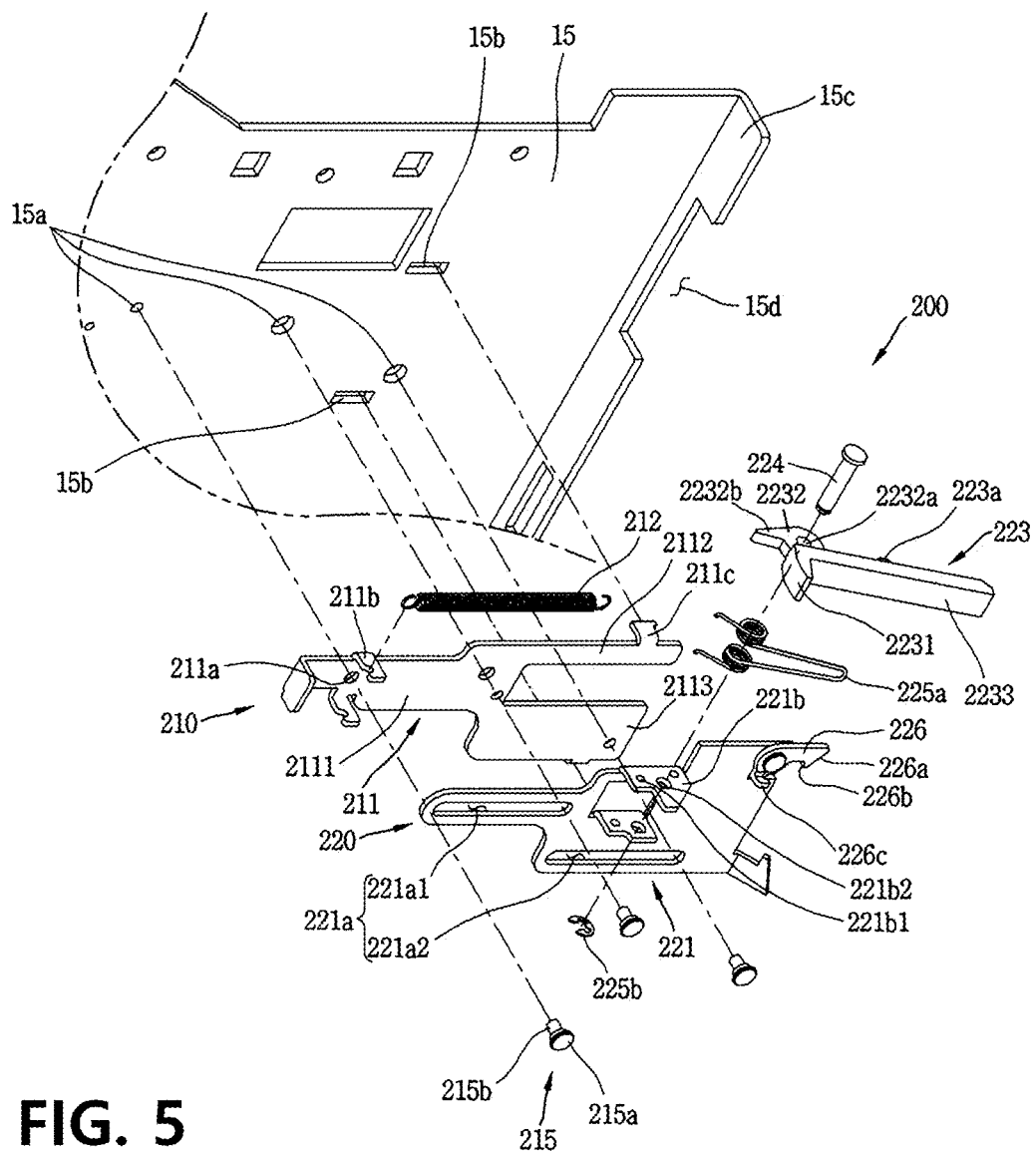
FIGS. 5 and 6 are an exploded perspective view and a perspective view of the shutter driving unit according to one embodiment of the present disclosure.
Figure 6:
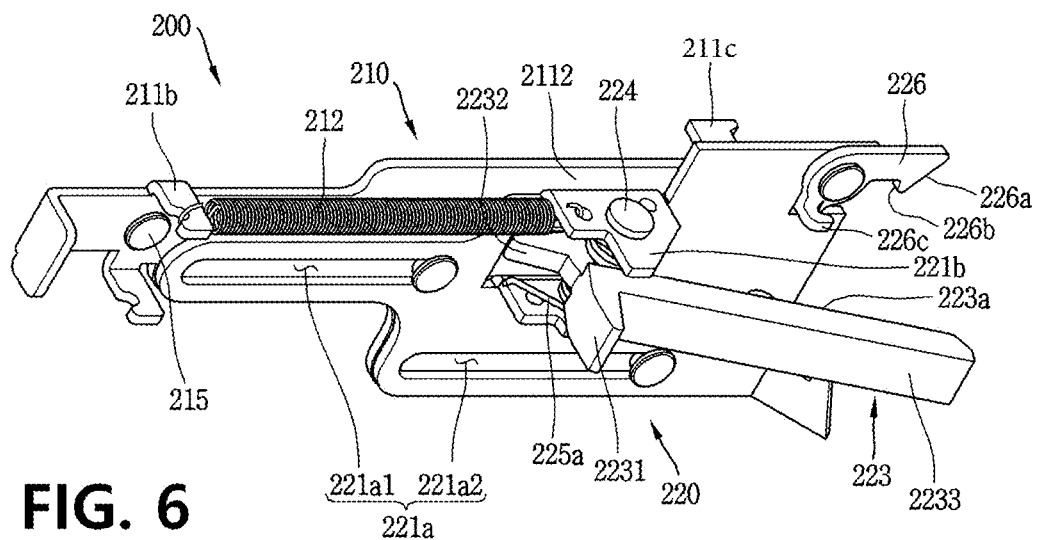
Figure 7:
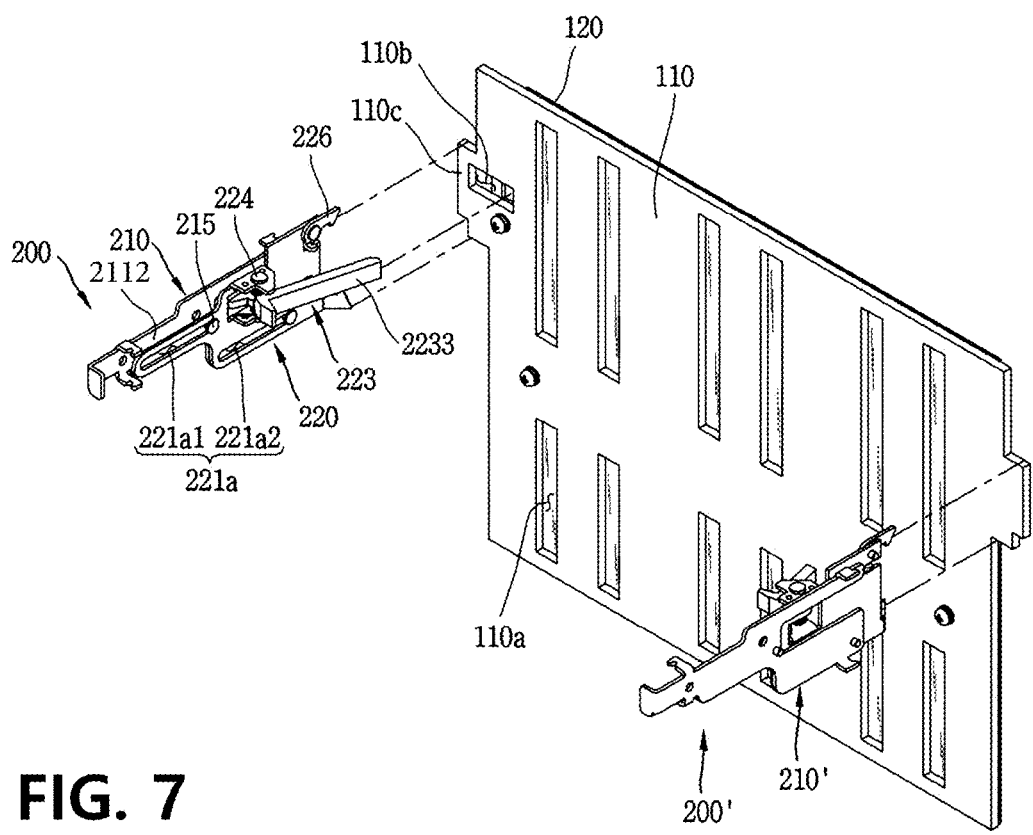
FIG. 7 is a perspective view illustrating a state in which the shutter driving unit and the shutter plate according to one embodiment of the present disclosure are coupled.
Figure 8:
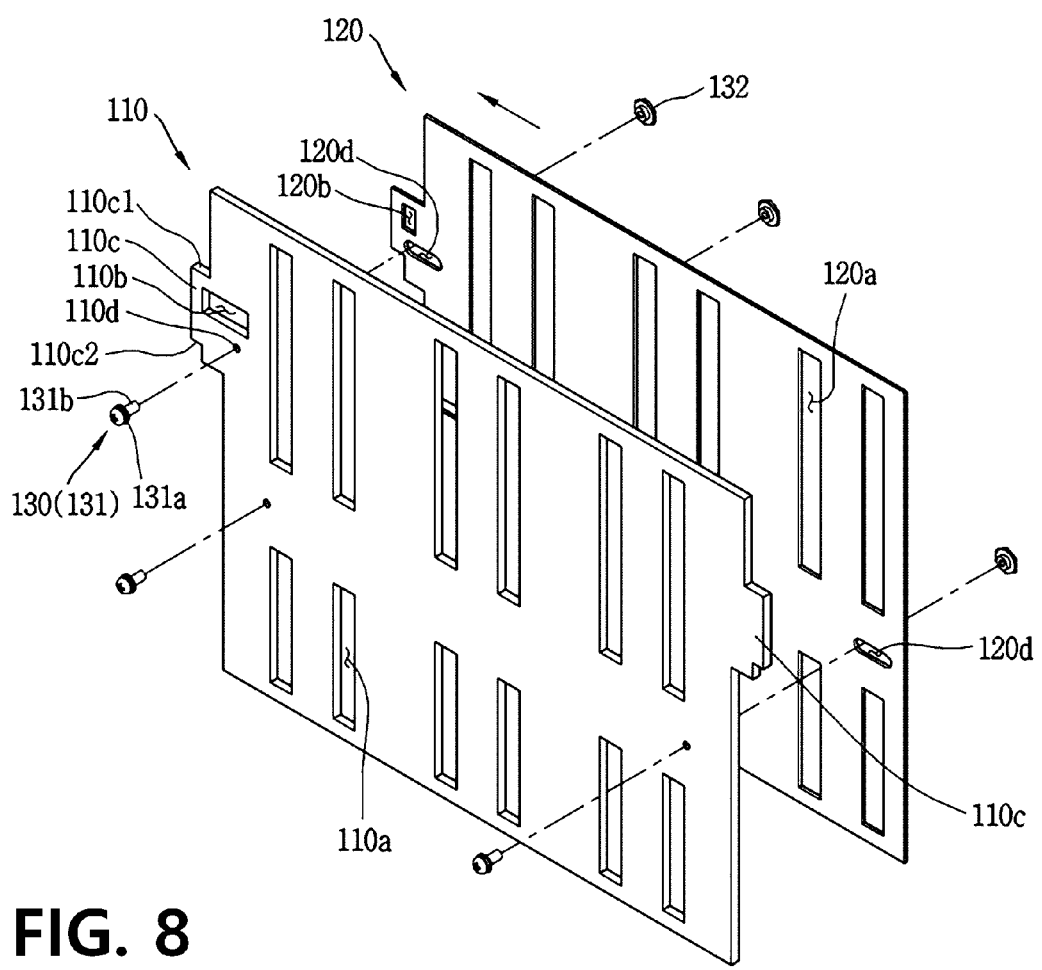
FIGS. 8 and 9 are perspective views illustrating the shutter plate according to one embodiment of the present disclosure from different directions.
Figure 9:
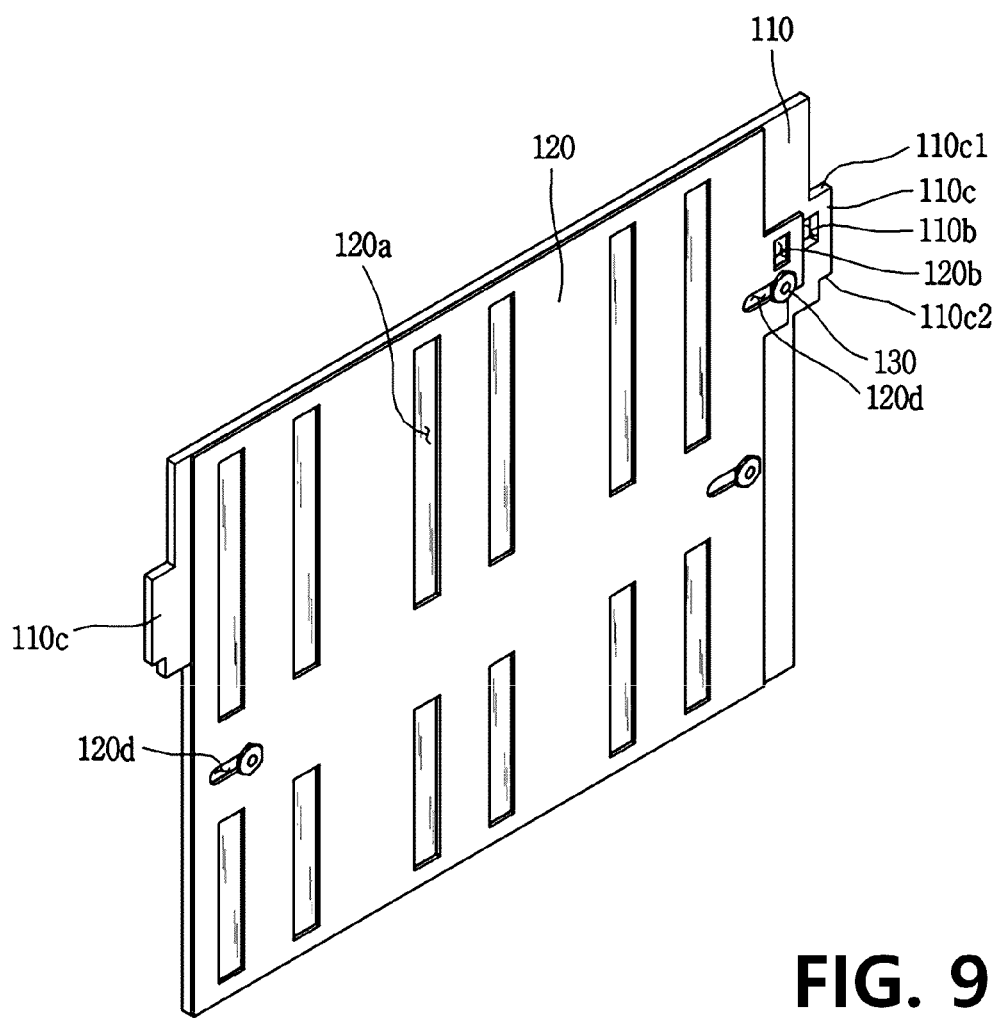

FIGS. 1 and 2 are perspective views illustrating a state in which a circuit breaker is inserted into a switchboard according to one embodiment of the present disclosure from different directions. FIGS. 3 and 4 are perspective views for describing a shutter plate and a shutter driving unit inside the switchboard according to one embodiment of the present disclosure. In this case, FIG. 3 illustrates a closed state of the shutter plate, and FIG. 4 illustrates an open state of the shutter plate. FIGS. 5 and 6 are an exploded perspective view and a perspective view of the shutter driving unit according to one embodiment of the present disclosure. FIG. 7 is a perspective view illustrating a state in which the shutter driving unit and the shutter plate according to one embodiment of the present disclosure are coupled. FIGS. 8 and 9 are perspective views illustrating the shutter plate according to one embodiment of the present disclosure from different directions.

Referring to FIGS. 1 and 2, a switchboard 1000 according to one embodiment of the present disclosure includes a switchboard case 10, a circuit breaker 20, and a shutter assembly 500.

<Switchboard 1000>

The switchboard case 10 has a space in which the circuit breaker 20 may be accommodated and may have a front surface formed with an opening 12 and a rear surface formed with an external terminal 41.

The switchboard case 10 is mounted to allow the circuit breaker 20 to be moved to a test position and a connect position. The switchboard case 10 may have a rectangular box structure. A side plate 15 may be provided on the switchboard case 10. A circuit breaker room for storing the circuit breaker 20 may be provided inside the switchboard case 10.

Figure 10:
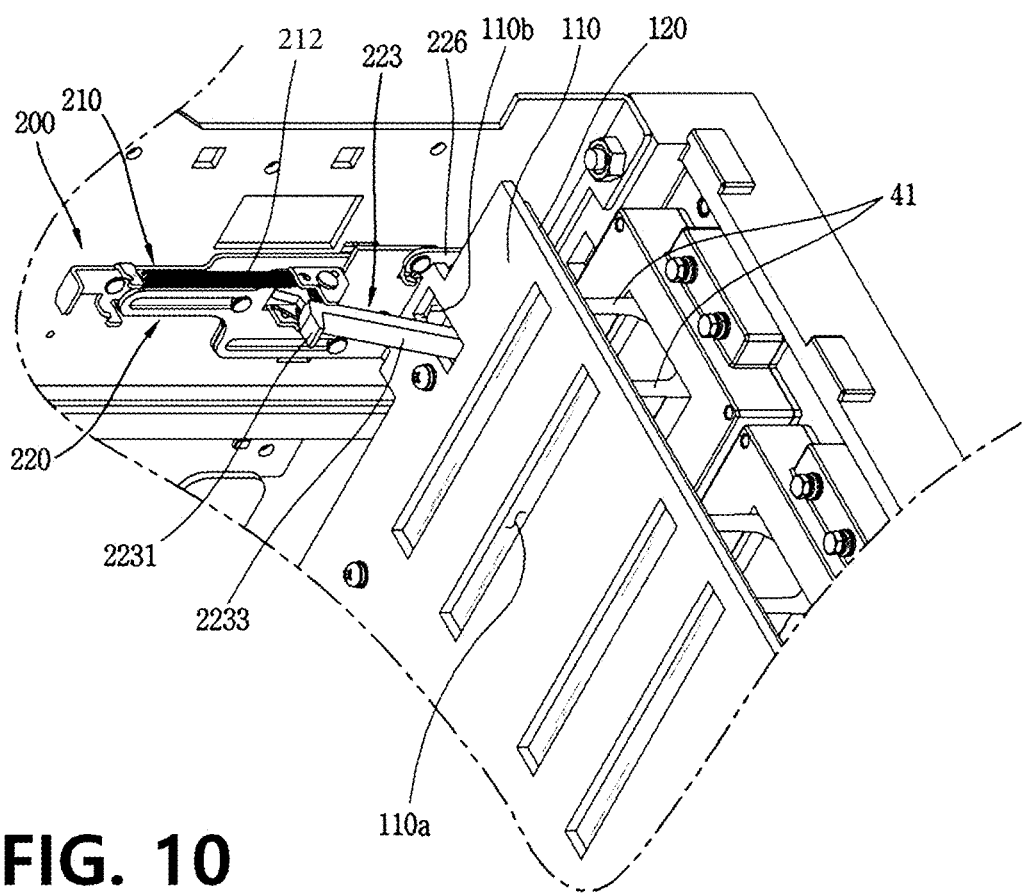
FIGS. 10 and 11 are partial perspective views for describing the shutter plate and the shutter driving unit inside the switchboard illustrated in FIGS. 3 and 4. In this case.

Referring to FIG. 10, the external terminal 41 is closed by the shutter plate 100 in a state in which the circuit breaker 20 is not inserted. Therefore, it is possible to prevent accidents that may occur when a current is applied to a main circuit.

The circuit breaker 20 includes a connection terminal 22 that may be connected to the external terminal 41 and may be inserted into and withdrawn from the switchboard case 10. The circuit breaker 20 may be inserted into and withdrawn from the switchboard case 10 using a circuit breaker moving unit 30.

The circuit breaker 20 may include a vacuum interrupter that has a moving contact portion and a fixed contact portion in a vacuum container to open and close an electrical-conduction current path.

The circuit breaker 20 may be moved in a front-rear direction within the switchboard case 10 by the circuit breaker moving unit 30. Specifically, the circuit breaker 20 may be moved to a TEST position (a position at which the circuit breaker 20 is positioned in a front portion of the switchboard case 10) and a RUN position (a position at which the circuit breaker 20 is positioned in a rear portion of the switchboard case 10—connected to the external terminal 41) in the switchboard case 10.

The circuit breaker moving unit 30 may include a moving frame for supporting a lower end portion of the circuit breaker 20 and moving wheels on corner portions of both side surfaces of the moving frame to move the circuit breaker 20 in the front-rear direction within the switchboard case 10.

The shutter assembly 500 is disposed inside the switchboard case 10 and allows the external terminal 41 to be opened or closed as the circuit breaker 20 is inserted and withdrawn.

The shutter assembly 500 according to one embodiment of the present disclosure includes the shutter plate 100 and the shutter driving unit 200.

<Shutter Plate 100>

The shutter plate 100 is disposed to cover the external terminal 41 disposed on a rear surface of the switchboard case 10. Specifically, referring to FIG. 10, the shutter plate 100 is disposed on a front surface of the external terminal 41 in a closed state. In addition, referring to FIG. 11, the shutter plate 100 is changed to an open state by being moved as the circuit breaker 20 is inserted, and in this case, allows the external terminal 41 to be exposed.

The shutter plate 100 may include a first shutter plate 110 and a second shutter plate 120.

Specifically, referring to FIGS. 3 and 4, the first shutter plate 110 is disposed inside the switchboard case 10. In addition, the first shutter plate 110 is configured to cover an inner cross section of the switchboard case 10. In other words, the first shutter plate 110 is configured to cover the external terminal 41 disposed on the rear surface of the switchboard case 10. In addition, a first opening 110a corresponding to the external terminal 41 is formed in the first shutter plate 110.

The second shutter plate 120 is disposed on a rear surface of the first shutter plate 110. The second shutter plate 120 is formed with a second opening 120a corresponding to the first opening 110a. The second shutter plate 120 may be moved inside the switchboard case 10 in a horizontal direction rather than the front-rear direction. Therefore, the second opening 120a of the second shutter plate 120 may be disposed to correspond to the first opening 110a of the first shutter plate 110.

Referring to FIG. 4, the external terminal 41 may be exposed by protruding to the outside of the shutter plate 100 through an opening in which the first opening 110a of the first shutter plate 110 and the second opening 120a of the second shutter plate 120 correspond.

<Shutter Driving Unit 200>

The shutter driving unit 200 is connected to one side of the shutter plate 100. The shutter driving unit 200 may be configured to move the shutter plate 100 in the front-rear direction, and at the same time, move at least a portion of the shutter plate 100 in the horizontal direction, Specifically, the shutter driving unit 200 may be configured to move the second shutter plate 120 in the horizontal direction.

The shutter driving unit 200 may be configured so that, as the circuit breaker 20 enters the switchboard case 10 so that the external terminal 41 covered by the shutter plate 100 is exposed toward the inside of the switchboard 1000, at least a portion thereof is rotated by being pressed by the circuit breaker 20 to move the shutter plate 100.

Specifically, as illustrated in FIGS. 1 and 2, when the circuit breaker 20 is inserted into the switchboard case 10, a shutter lever 223 of the shutter driving unit 200 is pressed by the circuit breaker 20. More specifically, a first portion 2231 of the shutter lever 223 may be pressed by a circuit breaker body 21. In this case, the shutter lever 223 to be pressed may be rotated. In addition, as the shutter lever 223 is rotated, the second shutter plate 120 into which the shutter lever 223 is inserted may be moved. In this case, the shutter driving unit 200 may include a bracket 210 and a slider 220.

<Bracket 210>

The bracket 210 is mounted on the side plate 15 of the switchboard case.

Specifically, referring to FIG. 5, the bracket 210 is fixed by inserting bolts 215 or coupling protrusions 211c into fixing holes 15a and fixing openings 15b formed in the side plate 15 of the switchboard case. When the bracket 210 is fixed to the side plate 15 of the switchboard case, it means that the slider 220 to be described below is formed to be moved in the front-rear direction with respect to the side plate 15 of the switchboard case, and the bracket 210 is fixedly coupled to the side plate 15 of the switchboard case.

The bracket 210 includes a bracket body 211 mounted on a side surface of the switchboard case 10.

The bracket body 211 may include elastic member hook protrusions 211b and the coupling protrusions 211c.

Specifically, referring to FIG. 5, the elastic member hook protrusions 211b may protrude from one end of the bracket body 211 and fix one end of an elastic member 212. The elastic member hook protrusions 211b may have a concave groove formed in the middle thereof so that the elastic member 212 is fixed without being separated.

The elastic member 212 may have one end fixed to the bracket body 211 and the other end fixed to the slider 220. Therefore, the elastic member 212 provides a restoring force to the slider 220 so that the slider 220 that moves when the circuit breaker 20 is withdrawn from the inside of the switchboard case 10 may return to an original position thereof.

The coupling protrusions 211c protrude from the other end of the bracket body 211. In addition, the coupling protrusions 211c protrude in a direction opposite to a protruding direction of the elastic member hook protrusions 211b. The coupling protrusions 211c may be inserted into the fixing openings 15b formed in the side plate 15 of the switchboard case. Therefore, the coupling protrusions 211c may support the bracket body 211 so that the bracket body 211 is not moved while the slider 220 is moved.

A fixing groove 211a through which a fixing unit for fixing the bracket body 211 to the side plate 15 of the switchboard case passes may be formed in the bracket body 211.

The bracket body 211 may include a main body 2111, a first split body 2112, and a second split body 2113.

The main body 2111 is disposed adjacent to the front surface of the switchboard case 10. The elastic member hook protrusions 211b may be formed on the main body 2111. In addition, fixing grooves 211a may be formed in the main body 2111. The bolt 215 may be inserted into the fixing grooves 211a. The bolt 215 may pass through the bracket body 211 and be fixed to the fixing holes 15a formed in the side plate 15 of the switchboard case. Therefore, the bracket body 211 (the main body 2111) may be firmly coupled to the switchboard case 10.

The first split body 2112 and the second split body 2113 may be vertically separated and extend from the main body 2111 toward the rear surface of the switchboard case 10. The coupling protrusions 211c coupled to the side plate 15 of the switchboard case may be disposed on the first split body 2112. In addition, the fixing grooves 211a may be formed in the second split body 2113.

The shutter assembly 500 according to one embodiment of the present disclosure may have a plurality of fixing grooves 211a formed in the bracket body 211 to firmly couple the bracket body 211 to the side plate 15 of the switchboard case.

In addition, the shutter assembly 500 according to one embodiment of the present disclosure may include the first split body 2112 and the second split body 2113 vertically separated and extending from the main body 2111 to the rear surface of the switchboard case 10, the fixing grooves 211a may be formed in the main body 2111 and the second split body 2113, and the coupling protrusions 211c may be formed in the first split body 2112 so that the bracket body 211 may be supported by the switchboard case side plate 15 with respect to a rotational moment that may be generated in the bracket body 211 in a process in which the slider 220 moves. Therefore, even when the rotational moment is generated in the bracket body 211, the bracket body 211 may be firmly coupled to the switchboard case 10 by the above-described structure.

<Slider 220>

Meanwhile, the slider 220 is connected to the bracket 210 to be moved relative to the bracket 210.

The slider 220 may be moved on the rear surface and the front surface of the switchboard case 10 by the circuit breaker 20 and may move at least a portion of the shutter plate 100.

Specifically, the slider 220 may be moved toward the rear surface of the switchboard case 10 as the first portion 2231 of the shutter lever 223 is pressed by the circuit breaker body 21. In other words, as the shutter lever 223 is pressed by the circuit breaker body 21, the slider 220 is moved in the front-rear direction inside the switchboard case 10.

Referring to FIG. 5, the side plate 15 of the switchboard case may be formed with a side plate extension 15c. In this case, the opening 15d of the slider 220 may be formed concavely so that the slider 220 may pass therethrough.

In addition, the slider 220 may be rotated as the first portion 2231 of the shutter lever 223 is pressed by the circuit breaker body 21. In other words, as the shutter lever 223 is pressed by the circuit breaker body 21, the shutter lever 223 is rotated. Specifically, the shutter lever 223 may be rotated about a through pin 224 to be described below. As the shutter lever 223 is rotated, the second shutter plate 120 caught on a third portion 2233 of the shutter lever 223 may be moved. Therefore, as illustrated in FIG. 4, the first opening 110a of the first shutter plate 110 and the second opening 120a of the second shutter plate 120 may be disposed to correspond to each other.

The slider 220 includes a slider body 221 and a shutter lever portion. The slider body 221 is mounted on the bracket 210 to move back and forth.

Specifically, guide grooves 221a through which the bolt 215 passing through the fixing groove of the bracket body 211 may pass and which are formed in a rectangular shape may be formed in the slider body 221. Specifically, referring to FIG. 5, the guide grooves 221a may be formed in the slider body 221. The bolt head 215a is caught on the guide grooves 221a, and the slider body 221 may be guided by the bolt head 215a and the bolt body 215b fitted into the guide grooves 221a when moved in the front-rear direction.

The guide grooves 221a formed in the slider body 221 may include a first guide groove 221a1 formed in a section corresponding to the main body 2111 and a second guide groove 221a2 formed in a section corresponding to the second split body 2113.

The shutter assembly 500 according to one embodiment of the present disclosure may include the first guide groove 221a1 and the second guide groove 221a2 formed to be separated in the vertical direction and the horizontal direction and may be absorbed by the bolt head 215a caught on the first guide groove 221a1 or the bolt head 215a caught on the second guide groove 221a2 with respect to the rotational moment that may be generated when the slider body 221 moves. Therefore, the slider body 221 may be moved straight without being rotated by the rotational moment generated when the slider body 221 is moved in the front-rear direction.

Meanwhile, the slider body 221 may further include an elastic member fixing protrusion 221b protruding from the rear surface of the first guide groove 221a1.

The elastic member hook protrusions 211b of the elastic member fixing protrusion 221b may protrude in the same direction. Elastic member fixing holes 221b1 are formed in the elastic member fixing protrusion 221b so that the other end of the elastic member 212 is caught. Therefore, the elastic member 212 may provide a restoring force to the slider body 221.

Meanwhile, through pin through holes 221b2 may be formed in the elastic member fixing protrusion 221b. A through pin 224 is inserted into the through pin through hole 221b2 to function as a rotational axis when the shutter lever 223 is rotated. When the through pin 224 is rotated, the elastic member fixing protrusion 221b may be formed at two positions spaced apart from each other in the vertical direction to prevent the through pin 224 from being rotated.

<Grip Hook 226>

The slider body 221 may include a grip hook 226 surrounding at least a portion of the shutter plate 100 and disposed so that a distance between the shutter plate 100 and the slider 220 is small.

The grip hook 226 may be disposed to protrude toward the rear side thereof in a longitudinal direction of the slider 220 and fixed to be rotated relative to the slider body 221.

The grip hook 226 may include an inclined portion 226a that is inclined so that a thickness becomes smaller toward an end portion thereof, and a protruding portion 226b protruding downward from the inside of the inclined portion 226a. In addition, the grip hook 226 may include a grip hook support portion 226c that can prevent excessive rotation when rotating. The grip hook support portion 226c may restrict a rotational radius of the grip hook 226 by coming into contact with the shutter plate 100 when the grip hook 226 rotates.

When the grip hook 226 is mounted on the shutter plate 100, the inclined portion 226a of the grip hook 226 may be pressed by an upper surface 110c1 and a lower surface 110c2 of a grip portion 110c of the shutter plate 100. Therefore, the grip hook 226 may be rotated upward and downward. In addition, when the grip portion 110c of the shutter plate 100 is disposed adjacent to the slider body 221, the grip hook 226 may return to the original position, and the grip portion 110c of the shutter plate 100 may be caught by the protruding portion 226b of the grip hook 226.

Specifically, referring to FIG. 8, the first shutter plate 110 may include grip portions 110c protruding from both sides of the shutter plate 100.

The grip portion 110c may have a vertical length corresponding to a separation distance of the grip protrusions to be gripped by the grip protrusions disposed to be separated vertically. Therefore, the grip protrusion disposed at an upper side may be configured to surround the upper surface 110c1 of the grip portion, and the grip protrusion disposed at a lower side may be configured to surround a lower surface 110c2 of the grip portion.

However, unlike the above description, the grip portion 110c may be formed in a shape that is open in the shutter plate 100. In other words, the grip protrusion may be inserted through the opening formed in the shutter plate 100 to couple the shutter plate 100 to the slider body 221.

In the shutter assembly 500 according to one embodiment of the present disclosure, since the shutter plate 100 is gripped adjacent to the slider body 221 by the grip hook 226, the slider body 221 and the shutter plate 100 may be moved in the front-rear direction together without being separated when the slider body 221 moves.

Therefore, a pressing force transmitted to the slider 220 may be easily transmitted to the shutter plate 100.

<Shutter Lever Unit>

The shutter lever unit may be coupled to the slider body 221 to be rotated according to a degree of movement of the circuit breaker 20 and may move the shutter plate 100.

Specifically, the shutter lever unit may include a shutter lever 223, a through pin 224, and a restoration member 225a.

The shutter lever 223 may have one side formed to be rotated by being pressed by the circuit breaker 20 and the other side formed to be fitted into the shutter plate 100.

Specifically, the shutter lever 223 may be divided into the first portion 2231, a second portion 2232, and a third portion 2233 according to a shape and a function thereof.

The first portion 2231 may be disposed to protrude toward an inner central portion of the switchboard case 10 and be rotated by being pressed as the circuit breaker 20 is inserted.

Referring to FIGS. 5 to 13, the first portion 2231 protrudes toward the inner central portion of the switchboard case 10. Therefore, as the circuit breaker 20 is inserted into the switchboard case 10, the circuit breaker body 21 may press the first portion 2231. When the first portion 2231 is pressed by the circuit breaker body 21, the slider 220 may be moved toward the rear surface of the switchboard case 10. At the same time, the shutter lever 223 may be rotated as the first portion 2231 is pressed.

The second portion 2232 may extend adjacent to the first portion 2231, and a through hole 2232*a* into which the through pin 224 is inserted may be formed.

Referring to FIG. 5, the second portion 2232 is formed adjacent to the first portion 2231. The through pin 224 is inserted through the through hole 2232*a* formed in the second portion 2232. The shutter lever 223 may rotate about the through pin 224.

Meanwhile, the second portion 2232 may have a stopper 2232*b* protruding from one side thereof. The stopper 2232*b* may prevent the shutter lever 223 from being excessively rotated by coming into contact with the circuit breaker body 21 when the shutter lever 223 is rotated.

The third portion 2233 may be inserted into the shutter plate 100 and moved as it is rotated to move the shutter plate 100.

Specifically, referring to FIGS. 5 to 13, the third portion 2233 is disposed to pass through a first through portion 110*b* of the first shutter plate 110 and a second through portion 120*b* of the second shutter plate 120. In addition, when the shutter lever 223 is rotated, the third portion 2233 presses the second shutter plate 120 so that the second shutter plate 120 is moved.

In addition, the third portion 2233 may further include a support protrusion 223*a* protruding from a rear surface of the second portion 2232 so that one end of the restoration member 225*a* is fixed. Specifically, referring to FIG. 5, the support protrusion 223*a* is configured so that one end of the restoration member 225*a* is caught thereon. Therefore, when the circuit breaker body 21 pressing the first portion 2231 is removed, the restoration member 225*a* presses the third portion 2233. Therefore, the shutter lever 223 may be returned to the original position.

The shutter lever unit may further include the restoration member 225*a* fitted between the elastic member fixing protrusions 221*b* and fixed by a through pin 224 fitted therein, and a through pin holder 225*b* mounted on an end portion of the through pin 224 to prevent the separation of the through pin 224.

The restoration member 225*a* is fitted into the through pin 224 to provide a restoration force to the shutter lever 223. In addition, the through pin 224 passes through at least a portion of the shutter lever unit. Specifically, the through pin 224 passes through the through hole 2232*a* formed in the second portion 2232 of the shutter lever 223 and provides an axis about which the shutter lever 223 rotates.

The shutter assembly 500 according to one embodiment of the present disclosure may close or open the external terminal 41 by moving the shutter plate 100 through a simple structure of the bracket 210 and the slider 220. Therefore, it is possible to increase the ease of the manufacture of the switchboard and reduce manufacturing costs.

Meanwhile, referring to FIG. 7, shutter driving units 200 may be disposed at both sides of the shutter plate 100. However, the shutter driving units 200 disposed at both sides may be different.

Specifically, referring to FIG. 7, the first shutter driving unit 200 disposed at a left side of the drawing may have the same structure as the shutter driving unit 200. On the other hand, a second shutter driving unit 200' disposed at a right side of the drawing may grip the first shutter plate 110 through the grip hook 226, but may not move the second shutter plate 120 through the shutter lever 223.

This is because, when the shutter levers 223 at both sides are configured symmetrically, directions in which the shutter levers 223 are rotated by the circuit breaker body 21 are opposite. Therefore, the second shutter driving unit 200' does not include the shutter lever 223 or may be provided with the short shutter lever 223.

Figure 11:
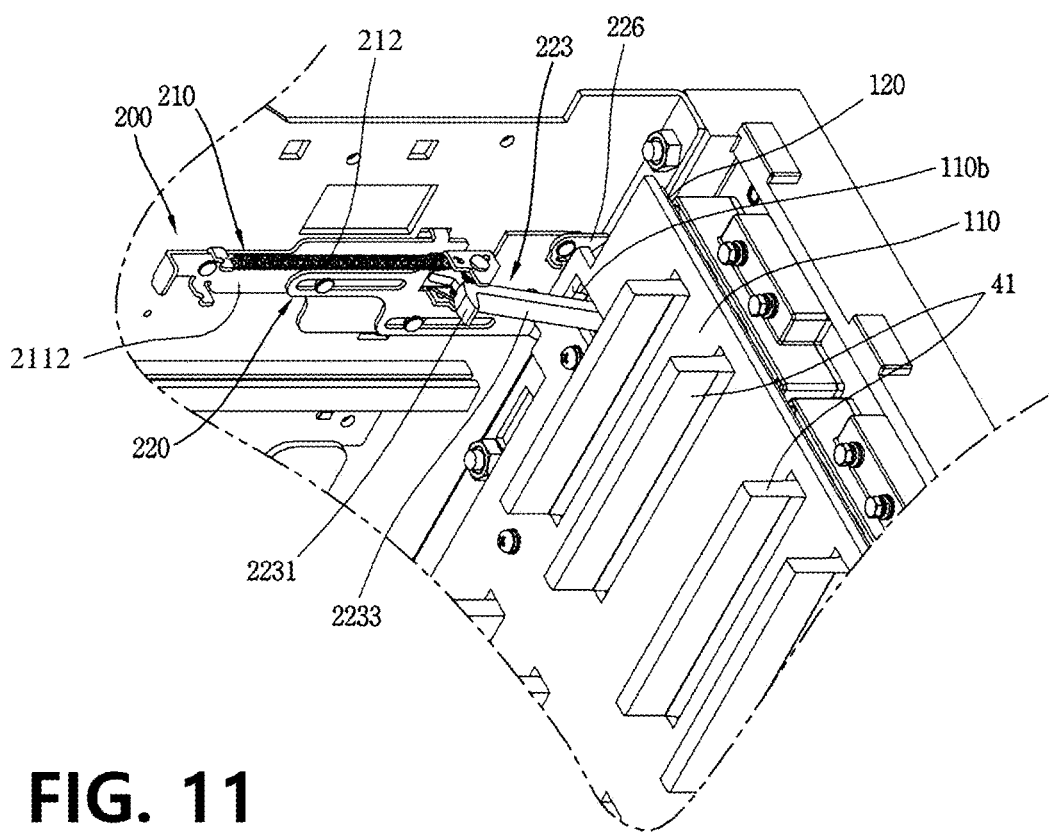
Figure 12:
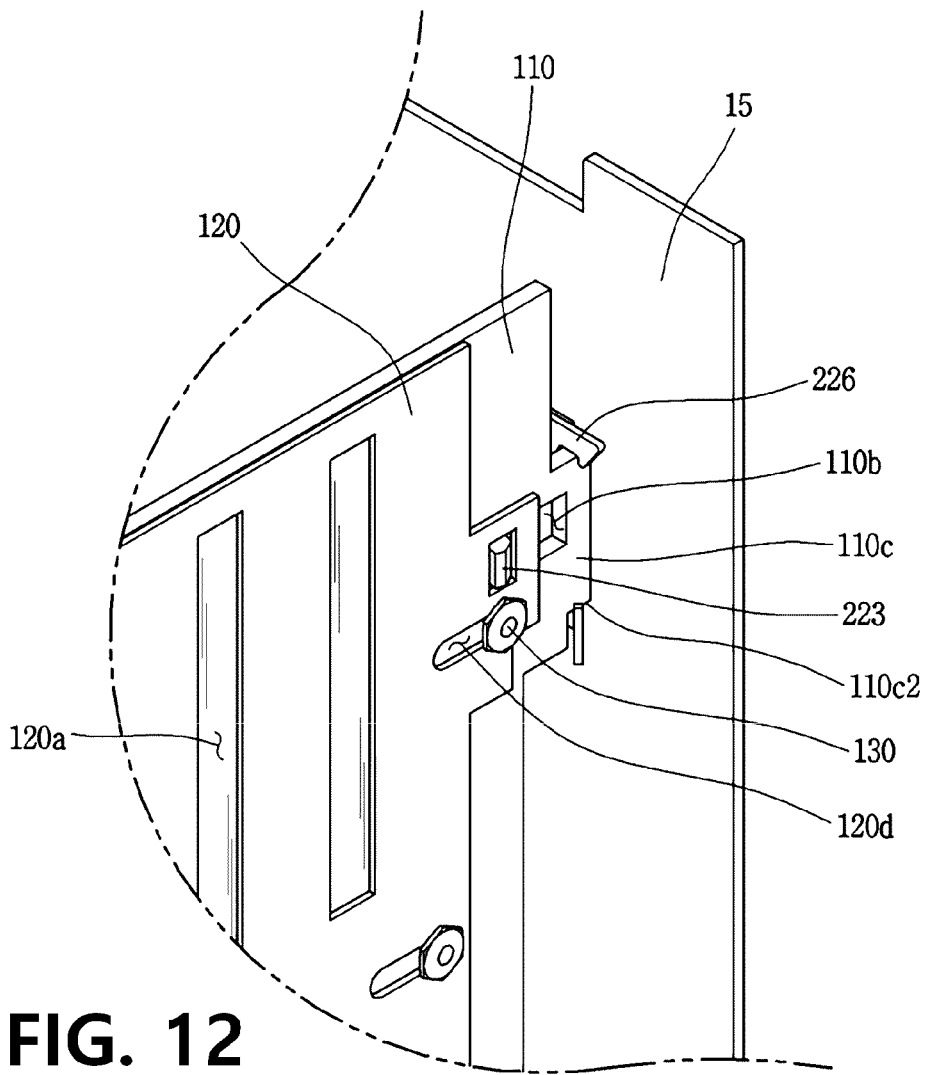
FIGS. 12 and 13 are partial perspective views illustrating a state in which the shutter plate changes from the closed state to the open state according to the rotation or movement of the shutter driving unit illustrated in FIGS. 10 and 11.
Figure 13:
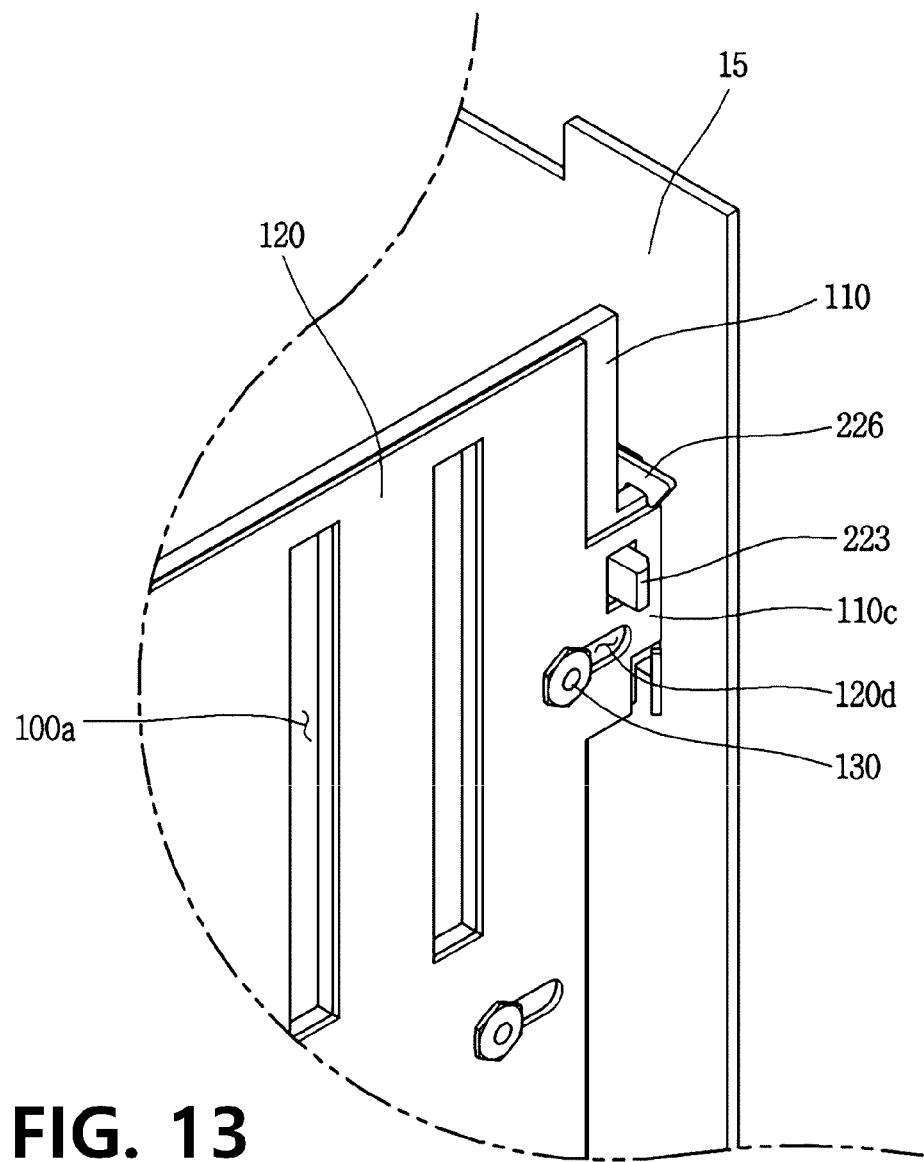

FIGS. 10 and 11 are partial perspective views for describing the shutter plate and the shutter driving unit inside the switchboard illustrated in FIGS. 3 and 4. In this case, FIG. 10 illustrates a closed state of the shutter plate, and FIG. 11 illustrates an open state of the shutter plate. FIGS. 12 and 13 are partial perspective views illustrating a state in which the shutter plate changes from the closed state to the open state according to the rotation or movement of the shutter driving unit illustrated in FIGS. 10 and 11.

Referring to FIGS. 8 to 10, the first shutter plate 110 and the second shutter plate 120 are disposed so that the first opening 110*a* and the second opening 120*a* are misaligned. This state is an initial state in which the circuit breaker 20 is not inserted into the switchboard case 10 or the circuit breaker 20 is inserted into the switchboard case 10. In other words, this is a state before the circuit breaker 20 presses the shutter driving unit 200. This state may be referred to as a closed state of the shutter plate 100.

In addition, referring to FIGS. 11 and 13, as the circuit breaker body 21 presses the shutter driving unit 200, the second opening 120*a* of the second shutter plate 120 may be moved to correspond to the first opening 110*a*. This state may be referred to as an open state of the shutter plate 100.

Referring to FIGS. 10 and 11, as the shutter plate 100 changes from the closed state to the open state, two or more movements of the shutter plate 100 may occur.

First, as the slider 220 moves toward the rear surface of the switchboard case 10, the first shutter plate 110 and the second shutter plate 120 move together with the slider 220 toward the rear surface of the switchboard case 10.

Accordingly, the shutter plate 100 for closing the external terminal 41 from a front surface of the external terminal 41 in the closed state may be changed to the open state and may protrude to the outside of the opening 100*a* of the shutter plate 100.

Second, as the shutter lever 223 of the slider 220 rotates, the second shutter plate 120 is moved in the left-right direction. Therefore, the second opening 120*a* of the second shutter plate 120 may be disposed to communicate with the first opening 110*a* of the first shutter plate 110. As the first opening 110*a* and the second opening 120*a* of the shutter plate 100 communicate with each other, the external terminal 41 protrudes through the opening of the shutter plate 100.

The above-described two movements occur simultaneously. In other words, the shutter plate 100 is moved to the rear surface of the switchboard case 10, and at the same time, the second shutter plate 120 moves to be disposed so that the second opening 120*a* of the second shutter plate 120 communicates with the first opening 110*a* of the first shutter plate 110.

Meanwhile, a first through portion 110*b* through which the shutter lever unit may pass may be formed in the first shutter plate 110. In addition, a second through portion 120*b* configured so that the shutter lever unit passing through the first through portion 110*b* may pass therethrough may be formed in the second shutter plate 120. The first through portion 110b may be formed to be wider than the second through portion 120b.

Specifically, referring to FIG. 8, the first through portion 110b formed such that the shutter lever 223 may pass therethrough is formed in the first shutter plate 110. In addition, the second through portion 120b through which the shutter lever 223 may pass is formed in the second shutter plate 120.

The shutter lever 223 moves the second shutter plate 120 while rotating.

At this time, since the rotating shutter lever 223 should not move the first shutter plate 110 in the left-right direction, it is preferable that the first through portion 110b of the first shutter plate 110 be formed largely in correspondence with an area in which the rotated shutter lever 223 is moved.

In addition, since the shutter lever 223 should move the second shutter plate 120 when rotated, the second through portion 120b of the second shutter plate 120 is formed to be smaller. Therefore, the first through portion 110b is formed to be wider in the left-right direction than the second through portion 120b.

Meanwhile, the shutter plate fixing groove 110d is formed in the first shutter plate 110. In addition, shutter plate guide grooves 120d are formed in the second shutter plate 120.

The first shutter plate 110 and the second shutter plate 120 are coupled by a shutter plate fixing member 130 that passes through the shutter plate fixing groove 110d and the shutter plate guide groove 120d. In addition, since the shutter plate guide groove 120d formed in the second shutter plate 120 is formed in a rectangular shape, the second shutter plate 120 moves the shutter plate guide groove 120d when the second shutter plate 120 moves.

The shutter plate fixing member 130 may be composed of bolts 131 and nuts 132. The bolt head 131a may be caught on the first shutter plate 110, and the nut 132 and the bolt head 131a disposed on the rear surface of the second shutter plate 120 may guide the second shutter plate 120 when the second shutter plate 120 moves.

In this case, a plurality of second shutter plate guide grooves 120d may be formed. The plurality of second shutter plate guide grooves 120d may reduce a rotational moment that may be generated when the second shutter plate 120 moves so that the second shutter plate 120 may be moved stably.

Although embodiments of the present disclosure have been specifically described above, the scope of the present disclosure is not limited to the above-described embodiments, and various modifications and improvements made by those skilled in the art using the basic concept of the present disclosure defined in the appended claims are also included in the scope of the present disclosure.

[DESCRIPTIONS OF REFERENCE NUMERALS]

| | |
|---|---|
| 1000: switchboard | 10: switchboard case |
| 12: front opening | 15: side plate |
| 15a: fixing hole | 15b: fixing opening |
| 15c: side plate extension | 15d: opening of slider |
| 20: circuit breaker | 21: circuit breaker body |
| 22: connection terminal | 30: circuit breaker moving unit |
| 41: external terminal | 100: shutter plate |
| 100a: shutter plate opening | 110: first shutter plate |
| 110a: first opening | 110b: first through portion |
| 110c: grip portion | 110c1: upper surface of grip portion |
| 110c2: lower surface of grip portion | 110d: fixing groove of shutter plate |

[DESCRIPTIONS OF REFERENCE NUMERALS]

| | |
|---|---|
| 120: second shutter plate | 120a: second opening |
| 120b: second through portion | 120d: guide groove of shutter plate |
| 130: fixing member of shutter plate | 131: bolt |
| 131a: bolt head | 131b: bolt body |
| 132: nut | 200, 200': shutter driving unit |
| 210, 210': bracket | 211: bracket body |
| 211a: fixing groove of bracket body | 211b: elastic member hook protrusion |
| 211c: coupling protrusion of bracket body | 2111: main body |
| 2112: first split body | 2113: second split body |
| 212: elastic member | 215: bolt |
| 215a: bolt head | 215b: bolt body |
| 220: slider | 221: slider body |
| 221a: guide groove | 221a1: first guide groove |
| 221a2: second guide groove | 221b: elastic member fixing protrusion |
| 22b1: elastic member fixing hole | 221b2: through pin through hole |
| 223: shutter lever | 2231 first portion |
| 2232: second portion | 2232a through hole |
| 2232b: stopper | 2233: third portion |
| 223a restoration member support protrusion | 224: through pin |
| 225a: restoration member | 225b: through pin holder |
| 226: grip hook | 226a: grip hook inclined portion |
| 226b: grip hook protruding portion | 226c: grip hook support portion |
| 500: shutter assembly | |

The invention claimed is:

1. A shutter assembly comprising:
a shutter plate disposed to cover an external terminal disposed on a rear surface of a switchboard case; and
a shutter driving unit connected to one side of the shutter plate and configured to move the shutter plate in a left-right direction, including:
 a bracket mounted on a side plate of the switchboard case that includes a bracket body mounted on a side surface of the switchboard case, and wherein the bracket body includes:
  an elastic member hook protrusion protruding from a first end of the bracket body and configured to fix a first end of an elastic member; and
  a coupling protrusion protruding from a second end of the bracket body opposite to the first end of the bracket body and protruding in a direction opposite to a protruding direction of the elastic member hook protrusion;
 a slider connected to the bracket to be moved relative to the bracket;
 a main body disposed close to a front surface of the switchboard case; and
 a first split body and a second split body vertically separated and extending from the main body toward the rear surface of the switchboard case,
wherein:
 when the slider is moved toward the rear surface or the front surface of the switchboard case by a circuit breaker, the slider moves at least a portion of the shutter plate
 the shutter driving unit is configured so that the shutter plate is moved by at least a portion that is rotated by being pressed by the circuit breaker as the circuit breaker enters the switchboard case so that the external terminal covered by the shutter plate is exposed toward an inside of a switchboard.

2. The shutter assembly of claim 1, wherein the bracket body is formed with a fixing groove through which a fixing unit configured to fix the bracket body to the side plate of the switchboard case passes.

3. The shutter assembly of claim 2, wherein
the coupling protrusion is coupled to the side plate of the switchboard case and is disposed on the first split body, and
the fixing groove is formed in the second split body.

4. The shutter assembly of claim 1, wherein the slider includes:
a slider body mounted on the bracket to be moved back and forth; and
a shutter lever unit coupled to the slider body and rotated according to a degree of movement of the circuit breaker to move the shutter plate.

5. The shutter assembly of claim 4, wherein the slider body includes an elastic member fixing protrusion configured to support a second end of the elastic member opposite to the first end of the elastic member.

6. The shutter assembly of claim 5, wherein the slider body includes a grip hook configured to surround at least a portion of the shutter plate and disposed so that a distance between the shutter plate and the slider is small.

7. The shutter assembly of claim 6, wherein the grip hook is disposed to protrude toward a rear surface of the slider in a longitudinal direction and fixed to be rotated relative to the slider body.

8. The shutter assembly of claim 7, wherein the grip hook includes:
an inclined portion formed to be inclined so that a thickness thereof becomes smaller toward an end portion thereof; and
a protruding portion protruding downward from an inside of the inclined portion.

9. The shutter assembly of claim 6, wherein a guide groove through which a bolt passing through a fixing groove of the bracket body passes and which is formed in a rectangular shape is formed in the slider body.

10. The shutter assembly of claim 9, wherein the guide groove formed in the slider body includes a first guide groove formed in a section corresponding to the main body, and a second guide groove formed in a section corresponding to the second split body.

11. The shutter assembly of claim 4, wherein the shutter lever unit includes:
a shutter lever having a first side formed to be rotated by being pressed by the circuit breaker and a second side formed to be fitted into the shutter plate;
a through pin passing through at least a portion of the shutter lever unit; and
a restoration member fitted into the through pin and providing a restoring force to the shutter lever.

12. The shutter assembly of claim 11, wherein the shutter lever includes:
a first portion disposed to protrude toward an inner central portion of the switchboard case and rotated by being pressed as the circuit breaker is inserted;
a second portion extending adjacent to the first portion and formed with a through hole into which the through pin is inserted; and
a third portion inserted into the shutter plate and moved while being rotated to move the shutter plate.

13. The shutter assembly of claim 12, wherein the third portion further includes a support protrusion protruding from a rear surface of the second portion so that one end of the restoration member is fixed.

14. The shutter assembly of claim 1, wherein the shutter plate includes:
a first shutter plate formed to cover a cross section of the switchboard case and formed with a first opening corresponding to the external terminal; and
a second shutter plate disposed on a rear surface of the first shutter plate and formed with a second opening corresponding to the first opening.

15. The shutter assembly of claim 14, wherein the first shutter plate and the second shutter plate are disposed so that the first opening and the second opening are misaligned, and
the second shutter plate is configured to move as the shutter driving unit is rotated so that the second opening corresponds to the first opening.

16. The shutter assembly of claim 15, wherein a first through portion through which a shutter lever unit passes is formed in the first shutter plate,
a second through portion through which the shutter lever unit passing through the first through portion passes is formed in the second shutter plate, and
the first through portion is formed to be wider than the second through portion.

17. A switchboard comprising:
a switchboard case having a space in which a circuit breaker is accommodated and having a front surface formed with an opening and a rear surface on which an external terminal is disposed;
a circuit breaker connected to the external terminal and inserted into and withdrawn from the switchboard case; and
a shutter assembly disposed inside the switchboard case and configured to open and close the external terminal as the circuit breaker is inserted and withdrawn,
wherein the shutter assembly includes:
a shutter plate disposed to cover the external terminal; and
a shutter driving unit connected to one side of the shutter plate and configured to move the shutter plate in a left-right direction, including:
a bracket mounted on a side plate of the switchboard case that includes a bracket body mounted on a side surface of the switchboard case, and wherein the bracket body includes:
an elastic member hook protrusion protruding from a first end of the bracket body and configured to fix a first end of an elastic member; and
a coupling protrusion protruding from a second end of the bracket body opposite to the first end of the bracket body and protruding in a direction opposite to a protruding direction of the elastic member hook protrusion;
a slider connected to the bracket to be moved relative to the bracket,
a main body disposed close to a front surface of the switchboard case; and
a first split body and a second split body vertically separated and extending from the main body toward the rear surface of the switchboard case, and
wherein:
the shutter driving unit is configured so that the shutter plate is moved by at least a portion that is rotated by being pressed by the circuit breaker as the circuit breaker enters the switchboard case so that the external terminal covered by the shutter plate is exposed toward an inside of a switchboard.

18. The switchboard of claim 17, wherein the shutter plate is disposed on a front surface of the external terminal in a closed state and configured to expose the external terminal when moved as the circuit breaker is inserted and changed to an open state, the shutter driving unit includes:
a bracket disposed by at least one side of the shutter plate and mounted on a side plate of the switchboard case; and
a slider connected to the bracket to be moved relative to the bracket, and
the slider is configured to move the shutter plate in a front-rear direction, and contemporaneously, move at least a portion of the shutter plate in the left-right direction.

\* \* \* \* \*